(12) United States Patent
Okada et al.

(10) Patent No.: US 9,182,520 B2
(45) Date of Patent: Nov. 10, 2015

(54) OPTICAL MATERIAL PRODUCTION PROCESS, OPTICAL MATERIAL AND OPTICAL LENS

(75) Inventors: Hiroyuki Okada, Osaka (JP); Hiroshi Horikoshi, Osaka (JP); Kenichi Toi, Mie (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 75 days.

(21) Appl. No.: 13/383,631

(22) PCT Filed: Jul. 12, 2010

(86) PCT No.: PCT/JP2010/061753
§ 371 (c)(1),
(2), (4) Date: Jan. 12, 2012

(87) PCT Pub. No.: WO2011/007749
PCT Pub. Date: Jan. 20, 2011

(65) Prior Publication Data
US 2012/0123081 A1    May 17, 2012

(30) Foreign Application Priority Data

Jul. 16, 2009  (JP) ................. 2009-167939

(51) Int. Cl.
*G02B 1/04* (2006.01)
*C08G 18/38* (2006.01)
*C08G 18/76* (2006.01)

(52) U.S. Cl.
CPC .............. *G02B 1/04* (2013.01); *C08G 18/3868* (2013.01); *C08G 18/3874* (2013.01); *C08G 18/3876* (2013.01); *C08G 18/7642* (2013.01); *G02B 1/041* (2013.01)

(58) Field of Classification Search
USPC ...................... 528/73, 76, 77, 81, 85; 359/642
IPC ...... C08G 18/3868,18/3874, 18/3876, 18/7642; G02B 1/04, 1/041
See application file for complete search history.

(56) References Cited

U.S. PATENT DOCUMENTS

| | | | | |
|---|---|---|---|---|
| 6,960,640 | B2* | 11/2005 | Yoshimura et al. | ............. 528/73 |
| 7,101,953 | B2* | 9/2006 | Kosaka | ............................. 528/73 |
| 2003/0225202 | A1* | 12/2003 | Kosaka | ......................... 524/589 |
| 2004/0122201 | A1* | 6/2004 | Yoshimura et al. | ............. 528/44 |
| 2004/0254258 | A1 | 12/2004 | Horikoshi et al. | |
| 2005/0062932 | A1 | 3/2005 | Kosaka et al. | |
| 2007/0149639 | A1 | 6/2007 | Horikoshi et al. | |
| 2010/0004421 | A1 | 1/2010 | Horikoshi et al. | |
| 2010/0093970 | A1 | 4/2010 | Kosaka et al. | |

FOREIGN PATENT DOCUMENTS

| | | |
|---|---|---|
| EP | 1518873 A2 | 3/2005 |
| EP | 1524289 B1 | 4/2005 |
| EP | 2058346 A1 | 5/2009 |
| JM | 2005-121679 A | 5/2005 |
| JP | 2002-122701 A | 4/2002 |
| JP | 2004-043526 A | 2/2004 |
| JP | 2004-175726 A | 6/2004 |
| JP | 2004-339329 A | 12/2004 |
| JP | 2005-298742 A | 10/2005 |
| JP | 2008-101190 A | 5/2008 |
| WO | WO 2004/005374 A1 | 1/2004 |
| WO | WO 2008/035643 A1 | 3/2008 |

* cited by examiner

*Primary Examiner* — Rabon Sergent
(74) *Attorney, Agent, or Firm* — Sughrue Mion, PLLC

(57) ABSTRACT

The present invention provides an optical material, an optical lens, and a production process for making the same. The production process includes a step of obtaining a first liquid by dissolving a compound (b) in compound (a);

a step of obtaining a second liquid by adding a compound (e) mixed with a portion of a compound (d) to the first liquid and mixing;

a step of obtaining a reaction mixture by adding a compound (c) to the second liquid and reacting the resulting mixture under reduced pressure;

a step of obtaining a resin composition for an optical material by adding the remainder of the compound (d) to the reaction mixture and mixing; and a step of obtaining an optical material by casting and polymerizing the resin composition.

9 Claims, No Drawings

OPTICAL MATERIAL PRODUCTION PROCESS, OPTICAL MATERIAL AND OPTICAL LENS

CROSS REFERENCE TO RELATED APPLICATIONS

This application is a National Stage of International Application No. PCT/JP2010/061753 filed Jul. 12, 2010, claiming priority based on Japanese Patent Application No. 2009-167939, filed Jul. 16, 2009, the contents of all of which are incorporated herein by reference in their entirety.

TECHNICAL FIELD

The present invention relates to an optical material such as a plastic lens, prism, optic fiber, information recording base or filter, and more particularly, to a process for producing a plastic lens for eyeglasses, an optical material and an optical lens.

BACKGROUND ART

Plastic lens are lightweight and rich in toughness, and are easily colored. Examples of performance particularly required of plastic lenses include low specific gravity, high transparency, low yellowing, optical performance in terms of high refractive index and high Abbe's number, high heat resistance and high strength. A high refractive index makes it possible to reduce thickness of the lens, while a high Abbe's number reduces chromatic aberration of the lens. Numerous organic compounds having sulfur atoms and/or selenium atoms have been reported in recent years for the purpose of imparting a high refractive index and Abbe's number. In particular, it is known that polyepisulfide compounds having sulfur atoms demonstrate a favorable balance between refractive index and Abbe's number. Consequently, optical materials have been reported in which sulfur is introduced to a polyepisulfide compound to maintain refractive index and thiourethane is introduced for improving shock resistance (Patent Document 1).

However, optical materials in which sulfur and thiourethane are introduced into a polyepisulfide compound have the problems of foaming and heat generation at the time of their production. Consequently, a process for producing optical materials has been reported that consists of reacting a prepolymer of an episulfide compound and sulfur atoms with a prepolymer of a compound having an isocyanate group and a compound having a mercapto group in order to suppress these problems (Patent Document 2).

PRIOR ART

Patent Document

Patent Document 1: Japanese Patent Application Laid-open No. 2002-122701
Patent Document 2: Japanese Patent Application Laid-open No. 2004-339329

DISCLOSURE OF THE INVENTION

Problem to be Solved by the Invention

However, in the production of the above-mentioned optical materials, and particularly plastic lens for eyeglasses, the decrease in yield occurs due to defect factors such as striae and deposits, and there has been a need to improve these.

An object of the present invention is to provide an optical material production process which is able to improve the decrease in yield caused by defect factors such as deposits and striae when optical materials having a high refractive index are produced, an optical material and an optical lens.

Means for Solving the Problem

As a result of conducting extensive studies to solve the above-mentioned problems, the inventors of the present invention found that a production process for an optical material using as raw materials thereof the following compounds (a), (b), (c), (d) and (e) is able to improve the decrease in yield caused by defect factors such as striae and deposits in a resulting optical material by going through the following Steps 1 to 5. Namely, the present invention is as described below.

1. A production process for an optical material having, as raw materials thereof, a compound (a), a compound (b), a compound (c), (d) and a compound (e) as shown below, the process comprising the following steps 1 to 5:

Step 1: a step of obtaining a first liquid by dissolving the compound (b) in the compound (a);

Step 2: a step of obtaining a second liquid by adding the compound (e) mixed with a portion of the compound (d) to the first liquid obtained in Step 1 and mixing the compound (e) mixed with a portion of the compound (d) with the first liquid;

Step 3: a step of obtaining a reaction mixture by adding the compound (c) to the second liquid obtained in Step 2 and reacting the resulting mixture under reduced pressure;

Step 4: a step of obtaining a resin composition for an optical material by adding the remainder of the compound (d) to the reaction mixture obtained in Step 3 and mixing the remainder of the compound (d) with the reaction mixture; and Step 5: a step of obtaining an optical material by casting and polymerizing the resin composition for an optical material obtained in Step 4; wherein, compound (a) is a compound having the structure represented by the following formula (1):

[Chemistry 1]

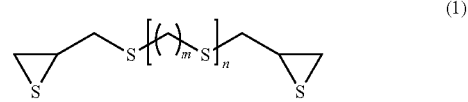

(1)

(where, m represents an integer of 0 to 4 and n represents an integer of 0 to 2), compound (b) is sulfur, compound (c) is at least one type of compound selected from the group consisting of m-xylylene diisocyanate, p-xylylene diisocyanate, m-tetramethylxylylene diisocyanate and p-tetramethylxylylene diisocyanate, compound (d) is at least one type of compound selected from the group consisting of bis(2-mercaptoethyl) sulfide, bis(2,3-dimercaptopropyl) sulfide, 1,2-bis(2-mercaptoethylthio) ethane, 2-(2-mercaptoethylthio)-1,3-dimercaptopropane, 2,5-bis(mercaptomethyl)-1,4-dithiane, 2,5-bis(2-mercaptoethyl)-1,4-dithiane, 2,5-bis(mercaptomethyl)-1-thiane, 2,5-bis(2-mercaptoethyl)-1-thiane, bis(4-mercaptophenyl) sulfide, bis(4-mercaptomethylphenyl) sulfide and 3,4-thiophenedithiol, and compound (e) is at least one type of compound selected from the group consisting of pentaerythritol tetrakismercaptopropionate, pentaerythritol tetrakisthioglycolate, tetrakis(mercaptomethyl) methane, tetrakis(mercaptomethylthiomethyl) methane, tetrakis(2-mercaptoethylthiomethyl) methane and tetrakis(3-mercaptothiomethyl) methane.

2. The optical material production process described in 1 above, wherein, in Step 2, a portion of the compound (d) is mixed with the compound (e) at a ratio of 2 parts by weight or less based on a value of 100 parts by weight for the total amount of the compound (a), compound (b), compound (c), compound (d) and compound (e).

3. The optical material production process described in 1 above, wherein, in Step 3, 5% to 30% of the compound (e) in the mixture is reacted with the compound (c).

4. The optical material production process described in 3 above, wherein, in Step 3, the reaction temperature is from 10° C. to 20° C., and the reaction time is from 2 hours to 4 hours.

5. An optical material obtained by the production process described in any one of 1 to 4 above.

6. An optical lens formed of the optical material described in 5 above.

Moreover, the specific flow of the steps is as described below:

Step 1: a first liquid is obtained by dissolving the compound (b) in the compound (a).

Step 2: a second liquid is obtained by uniformly mixing a portion of the compound (d), the compound (e) and the first liquid, Step 3: a reaction mixture is obtained by adding the compound (c) to the second liquid and reacting the compound (c) in the resulting mixture with the compound (e) under reduced pressure, Step 4: a resin composition for an optical material is obtained by adding the portion of the compound (d) not added in Step 2 to the reaction mixture obtained in Step 3 and uniformly mixing, and Step 5: an optical material is obtained by molding and polymerizing the above-mentioned resin composition for an optical material.

Effects of the Invention

A production process for an optical material using as raw materials thereof the above-mentioned compounds (a), (b), (c), (d) and (e) is able to improve the decrease in yield caused by defect factors consisting of striae and deposits by going through the above-mentioned Steps 1 to 5.

MODE FOR CARRYING OUT THE INVENTION

The following provides an explanation of the present invention.

The present invention is a production process for an optical material using as raw materials thereof the following compounds (a), (b), (c), (d) and (e), the process comprising the following Steps 1 to 5:

Step 1: a step for obtaining a first liquid by dissolving the compound (b) in the compound (a);

Step 2: a step for obtaining a second liquid by adding the compound (e) mixed with a portion of the compound (d) to the first liquid obtained in Step 1 and mixing the compound (e) mixed with a portion of the compound (d) with the first liquid;

Step 3: a step for obtaining a reaction mixture by adding the compound (c) to the second liquid obtained in Step 2 and reacting the resulting mixture under reduced pressure;

Step 4: a step for obtaining a resin composition for an optical material by adding the remainder of the compound (d) to the reaction mixture obtained in Step 3 and mixing the remainder of the compound (d) with the reaction mixture; and Step 5: a step for obtaining an optical material by casting and polymerizing the resin composition for an optical material obtained in Step 4.

The following provides a detailed explanation of the raw materials used in the present invention, namely the compounds (a), (b), (c), (d) and (e).

The compound (a) used in the present invention is a compound having a structure represented by the following formula (1). The amount of the compound (a) added is normally 60 parts by weight to 95 parts by weight, preferably 70 parts by weight to 90 parts by weight, and particularly preferably 75 parts by weight to 85 parts by weight in the case of assigning a value of 100 parts by weight to the total amount of the compounds (a) to (e). If the amount of the compound (a) added is less than 60 parts by weight, heat resistance may decrease, while if the amount added exceeds 95 parts by weight, strength may decrease:

[Chemistry 2]

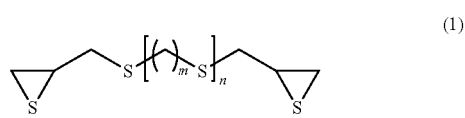

(1)

(wherein, m represents an integer of 0 to 4 and n represents an integer of 0 to 2).

Specific examples of the compound (a) include episulfides such as bis(β-epithiopropyl) sulfide, bis(β-epithiopropyl) disulfide, bis(β-epithiopropyl) trisulfide, bis(β-epithiopropylthio) methane, 1,2-bis(β-epithiopropylthio) ethane, 1,3-bis(β-epithiopropylthio) propane, 1,2-bis(β-epithiopropylthio) propane, 1,4-bis(β-epithiopropylthio) butane or bis(β-epthiopropylthioethyl) sulfide. One type of the compound (a) may be used alone or two or more types may be used as a mixture. Particularly preferable compounds consist of bis(β-epithiopropyl) sulfide and/or bis(β-epithiopropyl) disulfide, while the most preferable compound is bis(β-epithiopropyl) sulfide.

The amount of sulfur added as the compound (b) used in the present invention is normally 0.1 parts by weight to 5 parts by weight, preferably 0.3 parts by weight to 1 part by weight, and particularly preferably 0.4.5 parts by weight to 0.55 parts by weight based on a value of 100 parts by weight for the total amount of compounds (a) to (e).

The sulfur used in the present invention may be of any form. Although specific examples of the sulfur include finely powdered sulfur, colloidal sulfur, precipitated sulfur, crystalline sulfur and sublimated sulfur, finely powdered sulfur consisting of fine particles is preferable.

The sulfur used in the present invention may be produced by any process. Although sulfur is produced by such processes as sublimation purification from naturally-occurring sulfur ore, excavation of sulfur deposited underground by melting, or recovery by using as raw material hydrogen sulfide and the like from a petroleum or natural gas desulfurization process, any of these processes may be used.

The particle diameter of the sulfur used in the present invention is preferably smaller than 10 mesh, namely the sulfur is preferably in the form of a fine powder that is finer than 10 mesh. In case the particle diameter of the sulfur is greater than 10 mesh, it is difficult to dissolve the sulfur completely. Consequently, undesirable reactions and the like may occur in Step 1 resulting in the occurrence of problems. The particle diameter of the sulfur is preferably smaller than 30 mesh and most preferably smaller than 60 mesh.

The purity of the sulfur used in the present invention is preferably 98% or higher, more preferably 99.0% or higher, even more preferably 99.5% or higher, and most preferably 99.9% or higher. If the purity of the sulfur is 98% or higher, the color tone of the resulting optical material is further improved in comparison with the case of the purity being less than 98%.

Specific examples of the compound (c) include polyisocyanates such as m-xylene diisocyanate, p-xylene diisocyanate, m-tetramethylxylylene diisocyanate or p-tetramethylxylylene diisocyanate. One type of the compound (c) may be used alone or two or more types thereof may be used as a mixture. Among these, preferable specific examples of compound (c) include readily industrially available m-xylene diisocyanate and/or m-tetramethylxylylene diisocyanate, while the most preferable compound is industrially available m-xylene diisocyanate.

Specific examples of the compound (d) include compounds having two thiol groups in a molecule thereof, such as bis(2-mercaptoethyl) sulfide, bis(2,3-dimercaptopropyl) sulfide, 1,2-bis(2-mercaptoethylthio) ethane, 2-(2-mercaptoethylthio)-1,3-dimercaptopropane, 2,5-bis(mercaptomethyl)-1,4-dithiane, 2,5-bis(2-mercaptoethyl)-1,4-dithiane, 2,5-bis(mercaptomethyl)-1-thiane, 2,5-bis(2-mercaptoethyl)-1-thiane, bis(4-mercaptophenyl) sulfide, bis(4-mercaptomethylphenyl) sulfide or 3,4-thiophenedithiol. One type of the compound (d) may be used alone or two or more types thereof may be used as a mixture. Among these, preferable specific examples of compound (d) include bis(2-mercaptoethyl) sulfide and/or 2,5-bis(mercaptomethyl)-1,4-dithiane, while the most preferable specific example is industrially available bis(2-mercaptoethyl) sulfide.

Specific examples of the compound (e) include compounds having four thiol groups in a molecule thereof, such as pentaerythritol tetrakismercaptopropionate, pentaerythritol tetrakisthioglycolate, tetrakis(mercaptomethyl) methane, tetrakis(mercaptomethylthiomethyl) methane, tetrakis(2-mercaptoethylthiomethyl) methane and tetrakis(3-mercaptothiomethyl) methane. One type of the compound (e) may be used alone or two or more types thereof may be used as a mixture. Among these, preferable specific examples of the compound (e) include pentaerythritol tetrakismercaptopropionate and pentaerythritol tetrakisthioglycolate, and the most preferable compound is industrially available pentaerythritol tetrakismercaptopropionate.

Although the total amount of the compounds (b), (c), (d) and (e) cannot be unconditionally determined since the optical characteristics, strength and heat resistance of the resulting cured product vary according to the types of these compounds, normally the total amount of the compounds (b), (c), (d) and (e) is 40 parts by weight to 5 parts by weight to 60 parts by weight to 95 parts by weight of compound (a), the total amount of the compounds (b), (c), (d) and (e) is preferably 30 parts by weight to 10 parts by weight to 70 parts by weight to 90 parts by weight of compound (a), and particularly preferably the total amount of the compounds (b), (c), (d) and (e) is 25 parts by weight to 15 parts by weight to 75 parts by weight to 85 parts by weight of compound (a).

Moreover, the ratio of the total number of SH groups in the compounds (d) and (e) to the number of NCO groups of the compound (c), namely the number of SH groups in the compounds (d) and (e)/number of NCO groups of the compound (c) (SH groups/NCO groups) is preferably 1.0 to 2.5, more preferably 1.25 to 2.25 and even more preferably 1.5 to 2.0. If the above-mentioned ratio is less than 1.0, the cured product may be yellowed, while if the ratio exceeds 2.0, heat resistance may decrease.

The ratio of the number of SH groups in the compound (d) to the number of SH groups in the compound (e), namely the number of SH groups in the compound (d)/number of SH groups in the compound (e), is preferably within the range of 1.25 to 1.75. If the above-mentioned ratio exceeds 1.75, heat resistance may decrease. On the other hand, if the above-mentioned ratio is less than 1.25, the resulting optical material may be yellowed.

According to the production process of the present invention, a polymerization catalyst is preferably added to the compounds (a), (b), (c), (d) and (e) when obtaining an optical material. Alternatively, a resin composition for an optical material preferably contains a polymerization catalyst. Quaternary ammonium salts, quaternary phosphonium salts, tertiary sulfonium salts and secondary iodinium salts are preferable for use as polymerization catalysts, quaternary ammonium salts and quaternary phosphonium salts are particularly preferable since they demonstrate favorable compatibility with the resin composition for an optical material, and quaternary phosphonium salts are even more preferable. More preferable examples of polymerization catalysts include quaternary ammonium salts such as tetra-n-butylammonium bromide, triethylbenzylammonium chloride, cetyldimethylbenzylammonium chloride or 1-n-dodecylpyridinium chloride, and quaternary phosphonium salts such as tetra-n-butylphosphonium bromide or tetraphenylphosphonium bromide. Among these, even more preferable examples of polymerization catalysts include triethylbenzylammonium chloride and/or tetra-n-butylphosphonium bromide, while the most preferable polymerization catalyst is tetra-n-butylphosphonium bromide.

Although the amount of polymerization catalyst added cannot be unconditionally determined since the amount added varies according to the components of composition, the mixing ratio thereof and the polymerization curing method, normally the amount added is 0.0001 parts by weight to 10 parts by weight, preferably 0.001 parts by weight to 5 parts by weight, more preferably 0.01 parts by weight to 1 part by weight, and most preferably 0.01 parts by weight to 0.5 parts by weight based on a value of 100 parts by weight for the total amount of the compounds (a), (b), (c), (d) and (e). If the added amount of the polymerization catalyst exceeds 10 parts by weight, the refractive index and heat resistance of the cured product may decrease and coloring may occur. In addition, if the amount added of the polymerization catalyst is less than 0.0001 parts by weight, the resin composition for an optical material may not be adequately cured and heat resistance may be poor.

In addition, when producing an optical material using the production process of the present invention, the practicality of the resulting optical material can naturally be further improved by adding a known additive such an antioxidant, ultraviolet absorber, anti-yellowing agent, bluing agent or pigment to the compounds (a), (b), (c), (d) and (e).

Preferable examples of antioxidants include phenol derivatives. Particularly preferable compounds are polyvalent phenols and halogen-substituted phenols, more preferable compounds are a catechol, a pyrogallol and alkyl-substituted catechols, while the most preferable compound is a catechol.

Preferable examples of ultraviolet absorbers include benzotriazole-based compounds, while particularly preferable compounds are 2-(2-hydroxy-5-methylphenyl)-2H-benzotriazole, 5-chloro-2-(3,5-di-tert-butyl-2-hydroxyphenyl)-2H-benzotriazole and 2-(2-hydroxy-4-octylphenyl)-2H-benzotriazole.

The amounts added of these antioxidants and ultraviolet absorbers are normally 0.01 parts by weight to 5 parts by weight based on a value of 100 parts by weight for the total amount of compounds (a) to (e).

In addition, in the production process of the present invention, releasability of the resulting cured product from a mold can also be improved by using or adding a commonly known external and/or internal mold release agent in case it is difficult to release the cured product from the mold following polymerization. Examples of mold release agents include fluorine-based nonionic surfactants, silicon-based nonionic surfactants, phosphate esters, acidic phosphate esters manufactured by Stepan Company, oxyalkylene-based acidic phosphate esters, alkaline metal salts of acidic phosphate esters, alkaline metal salts of oxyalkylene-based acidic phosphate esters, metal salts of higher fatty acids, higher aliphatic esters, paraffin, wax, higher aliphatic amides, higher aliphatic alcohols, polysiloxanes and aliphatic amine ethylene oxide addition products. One type of these may be used alone or two or more types may be used as a mixture. The amount of mold release agent added is normally 0.01 parts by weight to 0.1 parts by weight based on a value of 100 parts by weight for the total amount of compounds (a) to (e).

During polymerization and curing of the resin composition for an optical material, a polymerization modifier can be added to the compounds (a), (b), (c), (d) and (e) as necessary for the purpose of extending pot life or dissipating the heat of polymerization. Examples of polymerization modifiers include halides of groups 13 to 16 of the long form of the periodic table. Preferable examples thereof include halides of silicone, germanium, tin and antimony, while more preferable examples include chlorides of germanium, tin and antimony having an alkyl group. Even more preferable examples include dibutyltin dichloride, butyltin trichloride, dioctyltin dichloride, octyltin trichloride, dibutyldichlorogermanium, butyltrichlorogermanium, diphenyldichlorogermanium, phenyltrichlorogermanium and triphenylantimony dichloride, while the most preferable compound is dibutyltin dichloride. One type of these polymerization modifiers may be used alone or two or more types may be used as a mixture.

The amount of polymerization modifier added is normally 0.0001 parts by weight to 5.0 parts by weight, preferably 0.0005 parts by weight to 3.0 parts by weight, and more preferably 0.001 parts by weight to 2.0 parts by weight based on a value of 100 parts by weight for the total amount of compounds (a) to (e). In case the added amount of the polymerization modifier is less than 0.0001 parts by weight, an adequate pot life is unable to be ensured for the resulting optical material, while in case the added amount of the polymerization modifier exceeds 2.0 parts by weight, the resin composition for an optical material may not be adequately cured and the heat resistance of the resulting optical material may decrease.

Next, a detailed explanation is provided of the previously described Steps 1 to 5.

(Step 1)

Step 1 is a step for obtaining a first liquid by dissolving the compound (b) in the compound (a). In this step, the conditions for dissolving are normally as indicated below. Namely, the dissolving temperature is preferably from 10° C. to 60° C. and the dissolving time is from 0.1 hours to 12 hours, more preferably the dissolving temperature is from 15° C. to 50° C. and the dissolving time is from 0.1 hours to 6 hours, and particularly preferably the dissolving temperature is from 20° C. to 40° C. and the dissolving time is from 0.1 hours to 2 hours. If the dissolving temperature is lower than 10° C., the dissolving time increases, while if the dissolving temperature is higher than 60° C., there is the problem of a decrease in the heat resistance of the optical material. Step 1 may be carried out in the presence of a gas such as air, nitrogen or oxygen, at ordinary pressure, or under an arbitrary sealed atmosphere resulting from elevated or reduced pressure. In addition, a solid component such as an antioxidant, ultraviolet absorber, polymerization catalyst or polymerization modifier may also be simultaneously dissolved in addition to the compound (b).

(Step 2)

Step 2 is a step for obtaining a second liquid by adding the compound (e) mixed with a portion of the compound (d) to the first liquid obtained in Step 1 and mixing the compound (e) mixed with a portion of the compound (d) with the first liquid. Here, the compound (e) mixed with a portion of the compound (d) is preferably uniformly mixed with the first liquid obtained in Step 1.

In this case, the compound (d) is preferably mixed with the compound (e) at a ratio of 2 parts by weight or less based on a value of 100 parts by weight for the total amount of the compounds (a), (b), (c), (d) and (e). In this case, the likelihood of the occurrence of deposits and striae in the resulting optical material is reduced and the yield of the optical material can be further improved.

There are no particular problems on the condition for uniformly mixing the compound (d) and the compound (e) provided they enable the compound (d) and the compound (e) to be uniformly mixed. Mixing may be carried out in the presence of a gas such as air, nitrogen or oxygen, at ordinary pressure, or under an arbitrary sealed atmosphere resulting from elevated or reduced pressure.

The conditions for adding and uniformly mixing the compound (e) that is uniformly mixed with a portion of the compound (d) with the first liquid that is a reaction liquid obtained in Step 1 after having uniformly mixed a portion of the compound (d) in Step 2 with the compound (e), namely the temperature and time, are preferably as indicated below. Namely, the temperature is from 10° C. to 20° C. and the time is from 0.1 hours to 1 hour. In case the temperature of the mixing condition is lower than 10° C., the viscosity of the second liquid increases. In case the mixing temperature is higher than 20° C., unnecessary polymerization of the first liquid serving as the reaction liquid may proceed.

When mixing the compound (d) and the compound (e) in Step 2, a polymerization catalyst and polymerization modifier may be simultaneously dissolved in the compound (d) and the compound (e). Mixing may be carried out in the presence of a gas such as air, nitrogen or oxygen, at ordinary pressure, or under an arbitrary sealed atmosphere resulting from elevated or reduced pressure.

(Step 3)

Step 3 is a step for obtaining a reaction mixture by adding the compound (c) to the second liquid obtained in Step 2 and reacting the resulting mixture under reduced pressure. Here, reacting under reduced pressure refers to reacting in an atmosphere in which the pressure is 0.10 kPa to 0.27 kPa, and the pressure can be realized by degassing the mixtureusing a vacuum pump, for example.

In Step 3 of the production process of the present invention, at least a portion of the compound (c) and the compound (e) are preferably allowed to react prior to casting the resin composition for an optical material. In case of casting and polymerizing the resin composition for an optical material obtained by reacting at least a portion of the compound (c) and the compound (e), there is less likelihood of the occurrence of striae and deposits in the optical material obtained by curing and the yield of the optical material is further improved. Here, although the entire amounts of the compound (c) and the compound (e) may also be allowed to react prior to casting, preferably only a portion thereof is allowed to react in order to ensure more adequately pot life.

More specifically, in Step 3, 5% to 30% of the compound (e) is preferably reacted with the compound (c). In case of casting and polymerizing the resin composition for an optical material obtained by reacting 5% to 30% of the compound (e) with the compound (c), there is even less likelihood of the occurrence of striae and deposits in the optical material obtained by curing, and the yield of the optical material is even further improved.

The reaction rate of the compound (e) in Step 3 is calculated by analyzing the resin composition for an optical material by liquid chromatography (GPC mode, RID detector). Here, a reaction rate of 0% means that the compound (e) has not reacted, while a reaction rate that is greater than 0% means that the compound (e) has reacted. Furthermore, the remainder of the compound (d) is added in Step 4 after confirming that 5% or more of the compound (e) has reacted. In case the consumption rate, namely the reaction rate, of the compound (e) is 5% or more, the decrease in yield attributable to deposits and striae are further improved in comparison with a reaction rate of less than 5%. If the reaction rate is 30% or less, the decrease in yield attributable to striae is further improved in comparison with the case of a reaction rate of greater than 30%.

The conditions for reacting the compound (c) and the compound (e) in Step 3, namely the reaction temperature and the reaction time, are as indicated below. Namely, normally the reaction temperature is 0° C. to 30° C. and the reaction time is from 0.5 hours to 12 hours, more preferably the reaction temperature is 5° C. to 25° C. and the reaction time is from 1 hour to 6 hours, and particularly preferably the reaction temperature is from 10° C. to 20° C. and the reaction time is from 2 hours to 4 hours. In case the reaction temperature of the reaction condition is lower than 0° C., the process time becomes long, while in case the reaction temperature is higher than 30° C., it may be difficult to control the reaction between the compound (c) and the compound (e).

In the production process for the resin composition for an optical material of the present invention, degassing treatment is preferably carried out in advance. Degassing treatment is carried out in Step 3, where the degassing treatment condition, that is, the pressure of the space within the container that houses the mixture in a sealed state, is preferably 3.33 kPa or less, more preferably 1.33 kPa or less, and particularly preferably 0.27 kPa or less. Components removed by the degassing treatment primarily are dissolved gases such as hydrogen sulfide and low boiling point compounds such as low molecular weight thiols. If degassing treatment is carried out at a degree of vacuum higher than 0.27 kPa, dissolved gas may remain resulting in a decrease in transparency of the optical material.

(Step 4)

Step 4 is a step for obtaining the resin composition for an optical material by adding the remainder of the compound (d) to the reaction mixture obtained in Step 3 and mixing the remainder of the compound (d) with the reaction mixture.

At this time, addition of the remainder of the compound (d) to the reaction mixture is preferably carried out after having confirmed that 5% or more of the compound (e) has reacted. In this case, defect factors such as striae and deposits are further improved in comparison with the case of adding the compound (d) to the reaction mixture in a state in which 5% of the compound (e) has not yet reacted. The conditions for mixing the compound (d) and the reaction mixture, namely the temperature and time, are normally as indicated below. Namely, the mixing temperature is from 10° C. to 20° C. and the mixing time is from 0.1 hours to 1 hour. In case the mixing temperature of the mixing condition is lower than 10° C., processing time becomes long, while in case the mixing temperature is higher than 20° C., it may be difficult to control the reaction between the compound (e) and the compound (c). At this time, degassing treatment may be carried out simultaneously to mixing of the compound (d) with the reaction mixture.

(Step 5)

Step 5 is a step for obtaining an optical material by casting and polymerizing the resin composition for an optical material obtained in Step 4.

When casting the resin composition for an optical material of the present invention in Step 5, removal of impurities by filtering with a microfilter and the like having a pore diameter of about 0.1 μm to 5 μm is preferable in terms of enhancing the quality of the optical material of the present invention.

Polymerization of the resin composition for an optical material of the present invention in Step 5 is normally carried out in the following manner. Namely, the curing time is normally from 1 hour to 100 hours and the curing temperature is normally from −10° C. to 140° C. Polymerization is carried out by a step for holding the prescribed polymerization temperature for a prescribed amount of time, a step for raising the temperature at a rate of 0.1° C./h to 100° C./h, and a step for lowering the temperature at a rate of 0.1° C./h to 100° C./h, or by a combination thereof. In addition, following completion of curing, carrying out annealing treatment on the resulting optical material at a temperature of 50° C. to 150° C. and for about 10 minutes to 5 hours is preferable for removing strain from the optical material of the present invention. Moreover, dyeing, hard-coating, shock-resistant coating, surface treatment for anti-reflection, antifog property or the like may also be carried out as necessary on the resulting optical material.

EXAMPLES

Although the following provides an explanation of the contents of the present invention through examples and comparative examples thereof, the present invention is not limited to the following examples.

Furthermore, striae and deposits in an optical material obtained according to the methods of the following examples and comparative examples were respectively evaluated according to the methods described below.

(Striae): Striae were evaluated visually in a cured product (optical material) by illuminating the cured product with light from a 250 W ultra-high-pressure mercury lamp (Model: USH-250SH, manufactured by Ushio Inc.) in a dark room. Cured products free of striae were evaluated as acceptable while those demonstrating striae were evaluated as unacceptable. In the following Tables 1 and 2, the percentages of the number of acceptable cured products to the number of prepared cured products (10) were indicated as yield.

(Deposits): Deposits was evaluated visually by illuminating a cured product (optical material) with light from fluorescent lamp in a dark room. In the following Tables 1 and 2, cured products free of deposits were evaluated as "A" while cured products demonstrating deposits were evaluated as "B".

Example 1

Reaction Temperature: 20° C., Reaction Time: 2 Hours, Reaction Rate: 30%, Amount of Compound (d) in Step 2: 2 Parts by Weight Step 1: 79.5 parts by weight of bis(3-epithiopropyl) sulfide (hereinafter referred to as compound (a1)), 0.5 parts by weight of sulfur as compound (b), 0.05 parts by weight of catechol as antioxidant and 1 part by weight of 2-(2-hydroxy-4-octylphenyl)-2H-benzotriazole as ultraviolet absorber were mixed in a reaction flask for 60 minutes at 30° C. to obtain a uniform mixture of first liquid. The first liquid was subsequently cooled to 20° C.

Step 2: 2.0 parts by weight of bis(2-mercaptoethyl) sulfide (referred to as compound (d1)), 6.6 parts by weight of pentaerythritol tetrakismercaptopropionate (referred to as compound (e1)), 0.09 parts by weight of n-butylphosphonium bromide and 0.01 parts by weight of dibutyltin dichloride were mixed well at a mixing temperature of 20° C. to obtain a uniform mixture followed by adding to the first liquid in the reaction flask and uniformly stifling for 1 hour at a mixing temperature of 20° C. to obtain a second liquid.

Step 3: 0.01 parts by weight of Zelec UN (manufactured by Stepan Company) which is a mold release agent and 7.2 parts by weight of m-xylylene diisocyanate (hereinafter referred to as compound (c1)) were mixed well at 20° C. to obtain a uniform mixture followed by adding to the second liquid in the reaction flask and allowing the obtained mixture to react by degassing and stirring the resulting mixture for 2 hours at a reaction temperature of 20° C. and a degree of vacuum of 0.27 kPa to obtain a reaction mixture. Two hours later, the reaction mixture was set in a GPC (column: K-802, manufactured by Shodex) followed by measurement of the reaction rate of the compound (e1) using the GPC. As a result, 30% of the compound (el) was confirmed to have reacted.

Step 4: 4.2 parts by weight of the compound (d1) were added to the reaction mixture in the reaction flask followed by degassing and stifling for 30 minutes at 15° C. and a degree of vacuum of 0.27 kPa to obtain a resin composition for an optical material.

Step 5: The resin composition for an optical material obtained in Step 4 was cast into a mold composed of two sheets of glass and tape having an edge thickness of 10 mm, center thickness of 15 mm and mold diameter of 75 mm followed by heating for 30 minutes at 29° C., raising the temperature to 100° C. at a constant rate over the course of 10 hours and finally heating for 2 hours at 100° C. to carry out polymerization and curing. After the cured product was allowed to cool, the cured product was released from the mold to obtain a cured optical material. The resulting optical material was annealed for 60 minutes at 110° C. to remove any strain caused by releasing from the mold. The results for yield attributable to striae and deposits of the resulting optical material were shown in Table 1.

Example 2

Reaction Temperature: 10° C., Reaction Time: 4 Hours, Reaction Rate: 10%, Amount of Compound (d) in Step 2: 1.74 Parts by Weight An optical material was obtained in the same manner as Example 1 with the exception of setting the added amount of the compound (d1) to 1.74 parts by weight and the mixing temperature to 10° C. in Step 2, setting the reaction temperature to 10° C. and the reaction time (degassing and stirring time) to 4 hours in Step 3, setting the reaction rate of the compound (e1) to 10%, and setting the added amount of the compound (d1) to 4.46 parts by weight in Step 4. The results for the yield attributable to striae and deposits of the resulting optical material were shown in Table 1.

Example 3

Reaction Temperature: 15° C., Reaction Time: 2 Hours, Reaction Rate: 5%, Amount of Compound (d) in Step 2: 1.74 Parts by Weight An optical material was obtained in the same manner as Example 1 with the exception of setting the added amount of the compound (d1) to 1.74 parts by weight and the mixing temperature to 15° C. in Step 2, setting the reaction temperature to 15° C. and the reaction rate of the compound (e1) to 5% in Step 3, and setting the added amount of the compound (d1) to 4.46 parts by weight in Step 4. The results for the yield attributable to striae and deposits of the resulting optical material were shown in Table 1.

Comparative Example 1

An optical material was obtained in the same manner as Example 1 with the exception of setting the added amount of the compound (d1) to 6.2 parts by weight in Step 2, setting the reaction time to 0.1 hours and the reaction rate of the compound (e1) to 0% in Step 3, and setting the added amount of the compound (d1) to 0 parts by weight in Step 4. The results for the yield attributable to striae and deposits of the resulting optical material were shown in Table 2.

Comparative Example 2

An optical material was obtained in the same manner as Example 1 with the exception of setting the added amount of the compound (d1) to 1.74 parts by weight and setting the mixing temperature to 10° C. in Step 2, setting the reaction temperature to 10° C., setting the reaction time to 0.1 hours and setting the reaction rate of the compound (e1) to 0% in Step 3, and setting the added amount of the compound (d1) to 4.46 parts by weight in Step 4. The results for the yield attributable to striae and deposits of the resulting optical material were shown in Table 2.

Comparative Example 3

In Step 1, 79.5 parts by weight of the compound (a1), 0.5 parts by weight of the compound (b1), 0.05 parts by weight of catechol as antioxidant and 1 part by weight of 2-(2-hydroxy-4-octylphenyl)-2H-benzotriazole as ultraviolet absorber were uniformly mixed in a reaction flask for 60 minutes at 30° C. to obtain a first liquid. The first liquid was subsequently cooled to 20° C.

In the next step (Step 2'), 2.0 parts by weight of the compound (d1), 6.6 parts by weight of the compound (e1), 0.09 parts by weight of n-butylphosphonium bromide and 0.01 parts by weight of dibutyltin dichloride were mixed well at 20° C. at atmospheric pressure to obtain a uniform mixture.

In the next step (Step 3'), 0.01 parts by weight of Zelec UN (manufactured by Stepan Company) which is a mold release agent and 7.2 parts by weight of compound (c1) were mixed well at 20° C. to obtain a uniform mixture followed by adding to the liquid obtained in Step 2' and mixing the resulting mixture for 30 minutes at 20° C. under atmospheric pressure. On the liquid obtained in this manner the reaction rate of the compound (e1) was measured in the same manner as Example 1. As a result, 5% of the compound (e1) was confirmed to have reacted.

In the next step (Step 4'), the liquid obtained in Step 3' and 4.2 parts by weight of the compound (b1) were added to the first liquid obtained in Step 1 and mixed uniformly to obtain a reaction composition.

In Step 5, the reaction composition obtained in Step 4' was cast into a mold composed of two sheets of glass and tape having an edge thickness of 10 mm, center thickness of 15 mm and mold diameter of 75 mm followed by heating for 30 minutes at 29° C., raising the temperature to 100° C. at a constant rate over the course of 10 hours and finally heating for 2 hours at 100° C. to carry out polymerization and curing. After the cured product was allowed to cool, the cured product was released from the mold to obtain a cured optical material. The resulting optical material was annealed for 60 minutes at 110° C. to remove any strain caused by releasing from the mold. The results for yield attributable to striae and deposits of the resulting optical material were shown in Table 2.

Comparative Example 4

An optical material was obtained in the same manner as Comparative Example 3 with the exception of setting the mixing temperature and mixing time of the mixture obtained in Step 3' of Comparative Example 3 to 30° C. and 1 hour, respectively, and setting the reaction rate of the compound (e1) to 30%. The results for yield attributable to striae and deposits of the resulting optical material were shown in Table 2.

TABLE 1

| Example | Added amount of compound (d1) in Step 2 (parts by weight) | Temperature in Step 2 (° C.) | Temperature in Step 3 (° C.) | Reaction rate of compound (e1) in Step 3 (%) | Yield attributable to striae (%) | Deposits |
|---|---|---|---|---|---|---|
| 1 | 2.0 | 20 | 20 | 30 | 100 | A |
| 2 | 1.74 | 10 | 10 | 10 | 100 | A |
| 3 | 1.74 | 15 | 15 | 5 | 100 | A |

TABLE 2

| Comparative Example | Added amount of compound (d1) in Step 2 or Step 2' (parts by weight) | Temperature in Step 2 or Step 2' (° C.) | Temperature in Step 3 or Step 3' (° C.) | Reaction rate of compound (e1) in Step 3 or Step 3' (%) | Yield due to striae (%) | Deposits |
|---|---|---|---|---|---|---|
| 1 | 6.2 | 20 | 20 | 0 | 0 | B |
| 2 | 1.74 | 10 | 10 | 0 | 5 | B |
| 3 | 2.0 | 20 | 20 | 5 | 0 | B |
| 4 | 2.0 | 20 | 30 | 30 | 10 | B |

The invention claimed is:

1. A production process for an optical material using, as raw materials thereof, a compound (a), a compound (b), a compound (c), a compound (d) and a compound (e) as shown below, the process comprising the following steps 1 to 5:

Step 1: a step of obtaining a first liquid by dissolving the compound (b) in the compound (a);

Step 2: a step of obtaining a second liquid by adding the compound (e) mixed with a portion of the compound (d) to the first liquid obtained in Step 1 and mixing;

Step 3: a step of obtaining a reaction mixture by adding the compound (c) to the second liquid obtained in Step 2 and reacting the resulting mixture under reduced pressure;

Step 4: a step of obtaining a resin composition for an optical material by adding the remainder of the compound (d) to the reaction mixture obtained in Step 3 and mixing; and Step 5: a step of obtaining an optical material by casting and polymerizing the resin composition for an optical material obtained in Step 4; wherein, compound (a) is bis(β-epithiopropyl) sulfide compound (b) is sulfur;

compound (c) is m-xylylene diiisocyanate;

compound (d) is bis(2-mercaptoethyl) sulfide;

compound (e) is pentaerythritol tetrakismercaptopropionate;

the amount of compound (a) added is 60 parts by weight to 95 parts by weight based on a value of 100 parts by weight for the total amount of compounds (a) to (e);

the amount of compound (b) added is 0.1 parts by weight to 5 parts by weight based on a value of 100 parts by weight for the total amount of compounds (a) to (e);

the ratio of the total amount of the compounds (b), (c), (d) and (e) to compound (a) ranges from 40:60 to 5:95 parts by weight for the total amount of compounds (a) to (e); and the portion of compound (d) that is mixed with compound (e) in step 2 consists of 2 parts by weight or less of compound (d), based on a value of 100 parts by weight for the total amount of the compound (a), compound (b), compound (c), compound (d) and compound (e).

2. The production process for an optical material according to claim 1, wherein in the step 3, 5% to 30% by weight of the total amount of compound (e) in the mixture is reacted with the compound (c).

3. The production process for an optical material according to claim 2, wherein in the step 3, the reaction temperature is from 10° C. to 20° C., and the reaction time is from 2 hours to 4 hours.

4. An optical material obtained by the production process according to claim 1.

5. An optical lens formed of the optical material according to claim 4.

6. An optical material obtained by the production process according to claim 2.

7. An optical lens formed of the optical material according to claim 6.

8. An optical material obtained by the production process according to claim 3.

9. An optical lens formed of the optical material according to claim 8.

* * * * *